United States Patent Office 3,027,323
Patented Mar. 27, 1962

3,027,323
WELL DRILLING COMPOSITIONS AND
PROCESS OF MANUFACTURE
Harry S. Stuchell, John W. Jordan, and Richard E. Offeman, Houston, Tex., assignors to National Lead Company, New York, N.Y., a corporation of New Jersey
No Drawing. Filed July 21, 1958, Ser. No. 749,646
6 Claims. (Cl. 252—8.5)

This invention relates to a method of preparing a composition suitable for use in treating oil well drilling fluids such as are employed in the rotary method of drilling. More particularly, this invention relates to the preparation of a composition useful in controlling the viscosity of oil well drilling fluids.

It has been known for many years that tannin and humic acid containing materials and compositions prepared therefrom can be added to oil well drilling fluids to control certain of their physical properties including viscosity, gel strength and filtration rate. The use of mixtures of humic acid containing materials and caustic soda for treating drilling fluids was taught, for example, in an early article by H. C. Lawton et al. published in the May 1932 issue of "Physics." The usual way in which these drilling fluid treating compositions have been prepared is by treating a relatively dilute water slurry of ground lignite or other humic acid containing material with a solution of caustic soda. In commercial practice, this method of preparing these compositions has some obvious disadvantages, including the problems of handling large volumes of caustic solution and the necessity of evaporating large volumes of water from the reacted mixture in order to obtain a dry composition capable of being easily handled.

Previous attempts to produce drilling fluid treating compositions from lignite or other humic acid containing materials and caustic soda by a dry processing technique have been unsuccessful due largely to a failure to appreciate the necessity for controlling the moisture content of the starting materials and the reaction mixtures. When too much moisture was present a semi-plastic mass formed which could not be handled in conventional types of mixing equipment. When too little moisture was present reaction did not take place and the resulting composition was a physical mixture of discrete particles of unreacted lignite and caustic soda. Such an unreacted mixture containing raw caustic soda presents a definite health hazard. This hazard is particularly apparent from the very irritating dust which is formed when the unreacted product is ground. The dust resulting from the addition of ground unreacted material to a drilling fluid is also quite objectionable.

By means of the present invention the disadvantages inherent in handling large volumes of aqueous liquid are effectively avoided and the failure encountered in prior art attempts to develop a dry processing technique are overcome.

It is, therefore, an object of the present invention to provide a novel and economical process for preparing an alkali metal-humic acid reaction product capable of reducing the viscosity of oil well drilling fluids.

Another object of the invention is to provide an alkali metal-humic acid reaction product produced by a dry processing technique that is capable of effectively controlling the viscosity of oil well drilling fluids.

It is a further object of the invention to provide a novel and economical process for preparing an alkali metal-humic acid reaction product which avoids the necessity of handling large volumes of aqueous liquids while producing a product that is not subject to dusting during normal handling.

In its broadest aspect the present invention contemplates a process for preparing a composition useful for reducing the viscosity of well drilling fluids which comprises mixing together pulverulent humic acid-containing material, e.g. lignite, having a selected moisture content between about 10 percent and 50 percent by weight with solid, pulverulent alkali metal hydroxide, conducting said reaction mixture under pressure toward and through an extrusion die during a period of time sufficient to complete the reaction between the alkali metal hydroxide and the humic acid, and pulverizing said extruded reaction product.

In a preferred embodiment of our invention, a crude naturally occurring lignite that has been dried to contain approximately 20 percent moisture is mixed with dry caustic soda which can be in granular, powdered, or flake form, the mixing operation being conducted in a pug mill of the type commonly used in the ceramic industry. A typical pug mill consists of a horizontal trough rounded off on the bottom half, a power driven shaft mounted along the length of the trough to which is attached anvil like knives which cut through the material being mixed and set at such an angle so as to impart longitudinal movement to the material. The type of pug mill which we have found most suitable for the practice of our invention is one which has an auger and die plate incorporated at one end of the mixing trough and through which the mixed material is extruded. The housing surrounding the auger is preferably tapered becoming slightly smaller toward the extrusion die, thus subjecting the material being mixed and extruded to considerably increased pressure. In mixing equipment of the preferred type the pressure and temperature to which the reactants are subjected can be conveniently controlled by modifying the construction of the die plate and auger. A die plate having comparatively few holes of small diameter will require greater pressure to be exerted upon the reaction mixture before it will extrude through the die, while a die plate having a greater number of holes of somewhat larger diameter will permit the reaction mixture to be extruded through the die comparatively easily and without an appreciable build up of pressure. The temperature of the reaction mixture can also be controlled by the rate at which the reactants are mixed in the pug mill which is in turn dependent upon the speed of rotation and design of the horizontal mixing shaft. Since our invention involves an exothermic reaction an increase in the rate of reaction will result in an increase in the temperature of the reaction mixture, thus, it is not necessary to use an external source of heat to control the temperature of the reaction. A very suitable type plug mill for the practice of our invention is known as the Terrier Extrusion Machine, manufactured by the Bonnot Company, Canton, Ohio.

The length of time the reactants should be retained in the mixing section of the pug mill will vary somewhat depending upon the moisture content of the lignite and the ambient temperature at which the reaction is conducted. The retention time of the reactants in the pug mill can be easily controlled by adjusting the speed of rotation of the shaft to which the mixing blades are attached or by modifying the angle of the blades. Lignites that have a moisture content between 10 and 50 percent can be reacted without drying with an alkali metal hydroxide in accordance with our invention, however a drying treatment prior to reaction may be employed if desired. In general, lignites having a low moisture content will require a longer reaction period than those with a moisture content of approximately 20% or higher.

The production of a semi-plastic reaction mixture, prior to the extrusion thereof and the resulting increased temperature and pressure to which the composition is subjected in a mill such as we have described is a vital part of our process. The increased temperature and pressure causes the reaction between the lignite and caustic soda to proceed much more rapidly and completely than would otherwise be possible with a reaction mixture containing the relatively small percentage of water used in our process. The extruded product produced in accordance with our invention is a uniformly reacted material that can be either fed directly to a grinder where it is pulverized to any desired degree of fineness or, if desired, the product can be dried at an elevated temperature before being pulverized in any suitable drier and pulverizing apparatus.

Any of the alkali metal hydroxides are suitable for use in carrying out this invention but because of economy and ready availability we prefer the use of sodium hydroxide. The alkali metal hydroxides useful in the practice of this invention can be anhydrous, however, this is not a requirement of the alkali metal hydroxide employed in our process. Commercially available powdered or flake caustic soda, normally containing 90 percent or more NaOH, has been found to be quite suitable for carrying out our invention. The term "dry" as used in reference to alkali metal hydroxides in the accompanying examples and claims is intended to include commercial grades of such materials even though they may contain some moisture.

The humic acid containing materials which can be advantageously processed according to our invention to produce an efficient drilling fluid treating composition include carboniferous minerals that are rich in alkali extractable humic acid. Such minerals include peat, lignite, lignite shale and weathered lignite.

The amount of alkali metal hydroxide used will vary according to the degree of alkalinity desired in the product for treating specific well drilling compositions. The alkali metal hydroxide used is, however, normally in excess of that required to react with the tannin or humic acid present in the reactant, the most preferred proportions of the reactants varying between 1 and 12 parts by weight of tannin or humic acid containing material to 1 part alkali metal hydroxide.

The following examples are offered as evidence of the simplicity of the contemplated process for producing an efficient, easily handled drilling fluid treating composition.

*Example I*

Four parts by weight of crude, ground, undried, weathered lignite mined in North Dakota containing approximately 35% moisture was mixed with one part by weight of commercial grade powdered caustic soda in a pug mill of the type described. Reaction of the components was evident as indicated by the evolution of heat and water vapor. The entire reaction mixture became semi-plastic and had a uniform putty-like appearance. The reaction was accelerated and driven to completion in the compression auger and extruding dies necessitating a retention time in the pug mill of from 2–3 minutes. The reacted product was readily extruded through a ½ inch steel die plate having seven 7/16 inch openings. The extruded rods or pellets were easily ground in a Raymond hammermill producing an efficient thinning composition for oil well drilling fluids.

*Example II*

Two and three tenths parts by weight of ground crude weathered lignite, calculated on a dry basis, was mixed with one part by weight of dry flaked caustic soda in a pug mill of the type described. The lignite had been previously dried to contain approximately 20% moisture. Reaction of the components was evidenced by the evolution of heat and water vapor. The reaction mixture had a uniform putty-like consistency which was readily extruded through a ½ inch steel die plate having seven 7/16 inch openings. The required retention time of the mixture in the pug mill to obtain complete reaction was approximately 2½ minutes from the time of initial introduction of the components at one end of the mixer until it was extruded through the die plate at the opposite end. The extruded product was dried at 300° F. for four hours and then ground in a Raymond hammermill.

The drilling fluid treating composition described in this example was tested for thinning efficiency in a drilling fluid in comparison with an equal portion of the unreacted lignite and caustic soda used in preparing the composition. The samples were evaluated in a drilling fluid containing 25 pounds of high grade bentonite clay per barrel of aqueous fluid in accordance with suggested procedure A–IV set out in API, RP 29, Fourth edition, May, 1957. The following values were obtained.

| Sample | Viscosity of the Drilling Fluid as Measured at 600 r.p.m. with a Standard Stormer Viscometer, Centipoises | |
|---|---|---|
| | Initial Test | After 16 Hours rolling at 150° F. |
| (1) Drilling fluid with no additive | 32 | 44 |
| (2) No. 1 plus 0.10 gram of caustic soda and 0.25 gram lignite per 350 ml. of drilling fluid | 28 | 42 |
| (3) No. 1 plus 0.20 gram of caustic soda and 0.50 gram lignite per 350 ml. of drilling fluid | 26 | 34 |
| (4) No. 1 plus 0.35 gram of the reacted product prepared in accordance with this example per 350 ml. of drilling fluid (product contained 0.10 g. caustic soda+0.25 g. lignite) | 24 | 39 |
| (5) No. 1 plus 0.70 gram of the reacted product prepared in accordance with this example per 350 ml. of drilling fluid (product contained 0.20 g. caustic soda+0.50 g. lignite) | 22 | 29 |

As can be seen from the above values, the reacted composition, samples 4 and 5, made in accordance with our invention is a more efficient thinner for oil well drilling fluids than an equivalent amount of the unreacted components, samples 2 and 3.

While our invention has been described and illustrated in terms of specific examples, it is not intended to be strictly limited thereto and other modifications and variations may be employed within the scope of the following claims.

Having described our invention, we claim:

1. A method of preparing a drilling fluid treating composition comprising mixing a material containing a substantial proportion of humic acid and having from 10 to 50% moisture with a dry alkali metal hydroxide, extruding the reaction mixture and thereafter drying and grinding the extruded reaction mixture to obtain a dry granular product.

2. A process in accordance with claim 1 wherein the humic acid containing material is weathered lignite.

3. A process in accordance with claim 1 wherein the alkali metal hydroxide is caustic soda.

4. A method of preparing a drilling fluid treating composition comprising mixing a humic acid containing material selected from the group consisting of peat, lignite, lignite shale and weathered lignite with a dry alkali metal hydroxide, said humic acid containing material having from 10 to 50% moisture, extruding the reaction mixture and thereafter drying and grinding the extruded reaction mixture to obtain a dry granular product.

5. A method of preparing a drilling fluid treating composition comprising mixing a material containing a substantial proportion of humic acid and having from 10 to 50% moisture with a dry alkali metal hydroxide, conducting the reaction mixture towards and through an extrusion die and thereafter grinding the extruded reaction mixture to obtain a dry granular product.

6. A method of preparing a drilling fluid treating composition comprising mixing between 1 and 12 parts by weight of a material containing a substantial proportion of humic acid and having from 10 to 50% moisture with 1 part by weight of a dry alkali metal hydroxide, extruding said reaction mixture and thereafter grinding the extruded reaction mixture to obtain a dry granular product.

References Cited in the file of this patent

UNITED STATES PATENTS

| | | |
|---|---|---|
| 2,650,197 | Rahn | Aug. 25, 1953 |
| 2,730,539 | Bradford | Jan. 10, 1956 |
| 2,783,201 | Rahn | Feb. 26, 1957 |
| 2,813,827 | Crowley et al. | Nov. 19, 1957 |

OTHER REFERENCES

Riegel-Industrial Chemistry, Fourth ed., pub. 1942 by Reinhold Publ. Corp., N.Y., pages 586 and 588.